United States Patent
Laaksonen et al.

(10) Patent No.: US 12,267,669 B2
(45) Date of Patent: Apr. 1, 2025

(54) SIGNALLING CHANGE EVENTS AT AN AUDIO OUTPUT DEVICE

(71) Applicant: Nokia Technologies Oy, Espoo (FI)

(72) Inventors: Lasse Juhani Laaksonen, Tampere (FI); Arto Juhani Lehtiniemi, Lempaala (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 295 days.

(21) Appl. No.: 17/900,926

(22) Filed: Sep. 1, 2022

(65) Prior Publication Data

US 2023/0076666 A1 Mar. 9, 2023

(30) Foreign Application Priority Data

Sep. 7, 2021 (EP) .................................... 21195205

(51) Int. Cl.
*H04S 7/00* (2006.01)
*G06F 3/16* (2006.01)
*H04R 1/10* (2006.01)

(52) U.S. Cl.
CPC .............. *H04S 7/308* (2013.01); *G06F 3/165* (2013.01); *H04R 1/1041* (2013.01)

(58) Field of Classification Search
CPC ........ H04S 7/308; G06F 3/165; H04R 1/1041
USPC ......................................................... 381/71.6
See application file for complete search history.

(56) References Cited

U.S. PATENT DOCUMENTS

| 10,708,706 B1 | 7/2020 | Brimijoin, II et al. |
| 2008/0144794 A1 | 6/2008 | Gardner |
| 2017/0188168 A1* | 6/2017 | Lyren ...................... H04S 7/302 |

* cited by examiner

*Primary Examiner* — Vivian C Chin
*Assistant Examiner* — Douglas J Suthers (57) ABSTRACT

An apparatus, method and computer program for signaling change events at an audio output device are disclosed. The apparatus may include circuitry for detecting, during an audio communications session between a first user device and a second user device, a change event at a first earphones device associated with the first user device, the first earphones device included of first and second earphones. The apparatus may also include circuitry for signaling the detected change event to the second user device and/or a second audio output device associated with the second user device.

20 Claims, 5 Drawing Sheets

SIGNALLING CHANGE EVENTS AT AN AUDIO OUTPUT DEVICE

FIELD

Example embodiments relate to an apparatus, method and computer program for signalling change events at an audio output device, for example a change event performed at an earphones device during an audio communications session between first and second user devices.

BACKGROUND

During an audio communications session between first and second user devices, each respective user of the user devices may use an output device which may comprise an earphones device linked to their user device. An earphones device may comprise first and second earphones, each of which is placed on, over or partly within left and right ears of a user and configured to output audio signals, e.g. as stereo or spatialized audio data. A change event, such as one user removing one of the earphones from their ear, may impact what that user is able to hear, particularly in the case of the audio signals comprising stereo or spatialized audio data.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: detecting, during an audio communications session between a first user device and a second user device, a change event at a first earphones device associated with the first user device, the first earphones device comprised of first and second earphones; and signaling the detected change event to the second user device and/or a second audio output device associated with the second user device.

The first earphones device may be configured to receive first and second receive channels representing stereo or spatialized audio content from the second user device, wherein the detected change event is one that reduces a user's ability to perceive the received stereo or spatialized audio content.

The detecting means may be configured to detect a change event corresponding to one of the first and second earphones of the first earphones device becoming removed from their ear.

The detecting means may be configured to detect a change event corresponding to a user initiating a function which mutes or attenuates one of the first and second receive channels.

The function may be a pass-through mode of an active noise reduction system.

The signaling means may be configured to signal the detected change event by means of modifying, or causing modification of, at least some audio content transmitted by the first user device to the second user device.

The first user device may be configured to transmit first and second transmit channels representing stereo or spatialized audio content to the second user device for output using the second audio output device, the second audio output device being a second earphones device comprised of first and second earphones.

The signaling means may be configured to signal the detected change event by means of modifying, or causing modification of, stereo audio content to become monaural audio content.

The signaling means may be configured to indicate, by means of output of the monaural audio content to one of the first and second earphones of the second earphones device, which of the first and second earphones of the first earphones device the change event is associated with.

The signaling means may be configured to signal the detected change event by means of modifying, or causing modification of, spatialized audio content to become stereo audio content.

The spatialized audio content may comprise a first channel representing a first audio object to be perceived from a particular direction and a second channel representing ambience to be perceived from a range of directions, wherein the signaling means may be configured to modify, or cause modification of, the spatialized audio content to become first and second monaural channels for output by particular ones of the respective first and second earphones of the second earphones device.

The signaling means may be configured to indicate, by means of output of the first and second monaural channels by particular ones of the first and second earphones of the second earphones device, which of the first and second earphones of the first earphones device the change event is associated with.

The first channel may represent a voice audio object for being output predominately from the direction of the first earphone of the first earphones device, wherein responsive to detection that the change event relates to said first earphone of the first earphones device, the signaling means is configured to indicate said change event by outputting the first channel as a monaural channel from the second earphone of the second earphones device.

The apparatus may be further configured such that, subsequent to detecting the removal of one of the first and second earphones of the first earphones device, it detects pickup of audio signals by one or more microphones of the removed earphone above a predetermined level, and, responsive thereto, re-spatializes the first and second channels for output by the second earphones device, at least temporarily.

The signaling means may be configured to causing modification by the second user device.

According to a second aspect, this specification describes a method, comprising: detecting, during an audio communications session between a first user device and a second user device, a change event at a first earphones device associated with the first user device, the first earphones device comprised of first and second earphones; signaling the detected change event to the second user device and/or a second audio output device associated with the second user device.

The first earphones device may receive first and second receive channels representing stereo or spatialized audio content from the second user device, wherein the detected change event is one that reduces a user's ability to perceive the received stereo or spatialized audio content. Detecting may comprise detecting a change event corresponding to one of the first and second earphones of the first earphones device becoming removed from their ear. Detecting may comprise detecting a change event corresponding to a user initiating a function which mutes or attenuates one of the first and second receive channels. The function may be a pass-through mode of an active noise reduction system.

Signaling may comprise signaling the detected change event by means of modifying, or causing modification of, at least some audio content transmitted by the first user device to the second user device.

The first user device may transmit first and second transmit channels representing stereo or spatialized audio content to the second user device for output using the second audio output device, the second audio output device being a second earphones device comprised of first and second earphones.

Signaling may comprise signaling the detected change event by means of modifying, or causing modification of, stereo audio content to become monaural audio content.

Signaling may comprise signaling indicating, by means of output of the monaural audio content to one of the first and second earphones of the second earphones device, which of the first and second earphones of the first earphones device the change event is associated with.

Signaling may comprise signaling the detected change event by means of modifying, or causing modification of, spatialized audio content to become stereo audio content.

The spatialized audio content may comprise a first channel representing a first audio object to be perceived from a particular direction and a second channel representing ambience to be perceived from a range of directions, wherein the signaling may modify, or cause modification of, the spatialized audio content to become first and second monaural channels for output by particular ones of the respective first and second earphones of the second earphones device.

Signaling may comprise indicating, by means of output of the first and second monaural channels by particular ones of the first and second earphones of the second earphones device, which of the first and second earphones of the first earphones device the change event is associated with.

The first channel may represent a voice audio object for being output predominately from the direction of the first earphone of the first earphones device, wherein responsive to detection that the change event relates to said first earphone of the first earphones device, the signaling may indicate said change event by outputting the first channel as a monaural channel from the second earphone of the second earphones device.

The method may further comprise, subsequent to detecting the removal of one of the first and second earphones of the first earphones device, detecting pickup of audio signals by one or more microphones of the removed earphone above a predetermined level, and, responsive thereto, re-spatializing the first and second channels for output by the second earphones device, at least temporarily.

Signaling may be configured to causing modification by the second user device.

According to a third aspect, this specification describes a computer program comprising instructions for causing an apparatus to perform at least the following: detecting, during an audio communications session between a first user device and a second user device, a change event at a first earphones device associated with the first user device, the first earphones device comprised of first and second earphones; signaling the detected change event to the second user device and/or a second audio output device associated with the second user device.

Example embodiments of the third aspect may also provide any feature of the second aspect.

According to a fourth aspect, this specification describes a computer-readable medium (such as a non-transitory computer-readable medium) comprising program instructions stored thereon for performing at least the following: detecting, during an audio communications session between a first user device and a second user device, a change event at a first earphones device associated with the first user device, the first earphones device comprised of first and second earphones; signaling the detected change event to the second user device and/or a second audio output device associated with the second user device.

According to a fifth aspect, this specification describes an apparatus comprising: at least one processor; and at least one memory including computer program code which, when executed by the at least one processor, causes the apparatus to: detect, during an audio communications session between a first user device and a second user device, a change event at a first earphones device associated with the first user device, the first earphones device comprised of first and second earphones; and signal the detected change event to the second user device and/or a second audio output device associated with the second user device.

BRIEF DESCRIPTION OF DRAWINGS

Example embodiments will now be described, by way of non-limiting example, with reference to the accompanying drawings, in which.

DETAILED DESCRIPTION

Example embodiments may relate to an apparatus, method and computer program for signalling change events at an audio output device, such as, but not limited to, a change event detected at an earphones device during a communications session.

First and second users, having respective first and second user devices, may communicate over a network in an audio communications session. Each of the first and second users may use an audio output device in the form of, for example, an earphones device comprised of a pair of first and second earphones, e.g. one for the right ear and one for the left ear. Example embodiments may focus on the use of earphones devices, but it should be appreciated that example embodiments are not limited to the use of earphones devices and it may be that the audio output devices referred to herein, at least for the second user, may comprise other forms of audio output transducer such as a pair of loudspeakers.

The terms earphones device and earphones, as used herein, may be interpreted broadly to cover any form of output transducer configured to locate over, adjacent or partly within a user's ear or ear canal, including those disposed as part of a wearable headset such as a virtual reality (VR) headset, as a set of earbuds and so on.

Earphones devices comprising a pair of such earphones may be used to output stereo (left and right channels) or even spatialized audio to the user depending on the audio signals received. For example, the audio signals may represent monaural audio in one channel for monaural output via one earphone, two monaural channels for output via two earphones as stereo output, or spatialized audio comprised of two binauralized channels whereby one or both of the channels may also comprise metadata indicative of where in the sound field the audio is to be perceived by the relevant user.

Example embodiments appreciate that, when one of the first and second users involved in an audio communications session effects an event, such as removing one of their earphones or perhaps invoking a function that may affect audio output by one of their earphones, the audio experience for them may become more limited. For example, stereo or spatialized audio output may become monaural. This may not be appreciated by the other user on the audio communications session. The other user may be conveying important information which can no longer be perceived at the other end.

Figure 1A:
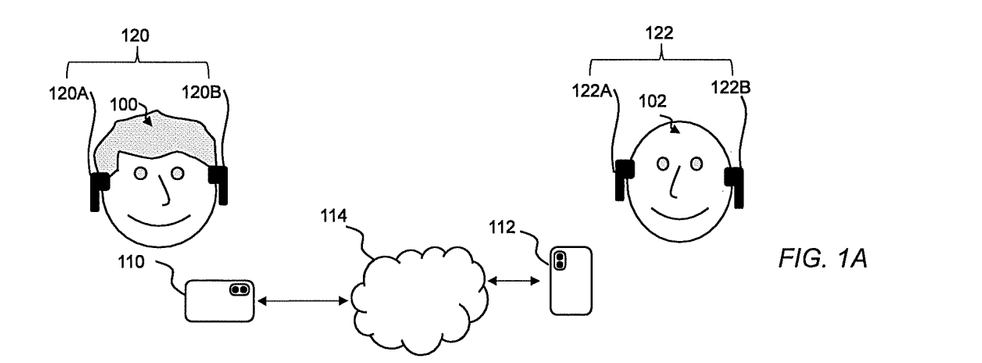
FIG. 1A is a schematic view of first and second users with respective first and second earphones devices engaged in a communications session.
Figure 1B:
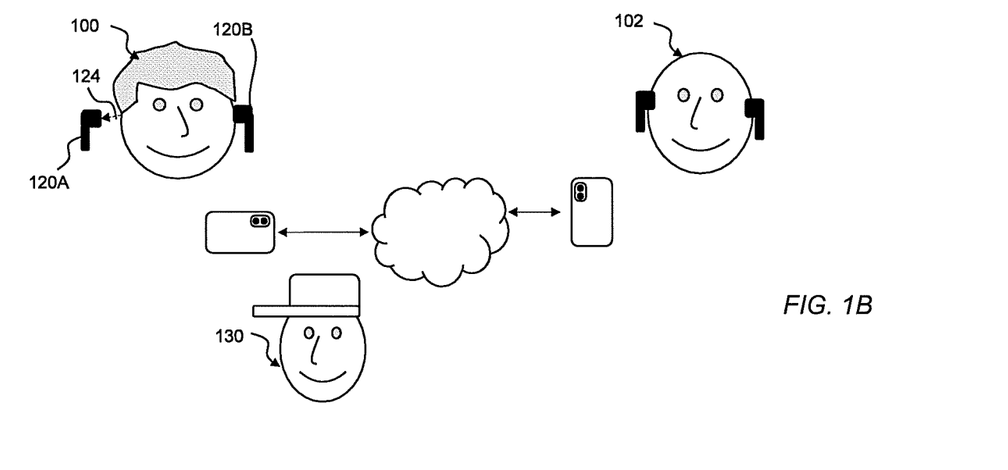
FIG. 1B is a schematic view based on FIG. 1A, indicating an earphone of the first earphones device becoming removed.

FIGS. 1A and 1B show a practical scenario useful for understanding example embodiments.

Referring to FIG. 1A, a first user 100 and second user 102 may establish an audio communications session by means of respective first and second user devices 110, 112 over a communications network 114.

The audio communications session may also comprise accompanying video data, i.e. as part of a video call, and the audio communications session may not be limited to one involving only the first and second users 100, 102. For example, the audio communications session may comprise a conference call or a videoconference call involving three or more users. The communications network 114 may comprise an Internet Protocol (IP) network or another form of network such as a cellular radio access network (RAN) involving the use of one or more transmission points (TRPs) connected to a core network.

The first user 100 may hear audio from the second user 102 using a first earphones device 120 comprising a first earphone 120A and second earphone 120B. Capture of audio from the first user 100 for transmission as part of the communications session may be by one or more microphones of the first earphone 120A and/or the second earphone 120B or an accessory thereof. Alternatively, or additionally, audio may be captured by one or more microphones of the first user device 110. Indeed, in example embodiments, the audio that is captured from the first user 100 may comprise stereo or spatialized audio which involves capture using multiple microphones on one or more of the first earphone 120A, the second earphone 120B and/or the first user device 110. The first earphones device 120 may be associated with the first user device 110, for example by a wired connection or a wireless connection using pairing or linking according to a suitable wireless protocol such as Bluetooth, Zigbee or WiFi, e.g. using the IEEE 802.11 communications standard.

In example embodiments, the second user 102 may hear audio from the first user 100 using a second earphones device 122 comprising a first earphone 122A and a second earphone 122B. For the avoidance of doubt, and similar to the above, capture of audio from the second user 102 for transmission as part of the audio communications session may be by one or more microphones of the first earphone 122A and/or the second earphone 122B. Alternatively, or additionally, audio may be captured by one or more microphones of the second user device 112. Indeed, in example embodiments, the audio that is captured from the second user 102 may comprise stereo or spatialized audio which involves capture using multiple microphones on one or more of the first earphone 122A, second earphone 122B and/or the second user device 112. The second earphones device 122 may be associated with the second user device 112, for example by a wired connection or a wireless connection using pairing or linking according to a suitable wireless protocol such as Bluetooth, Zigbee or WiFi, e.g. using the IEEE 802.11 communications standard.

The first and second user devices 110, 112 may comprise any processing device capable of providing at least audio data to their respective earphone devices, i.e. 120, 122 for output, and for transmission of captured audio data to the communications network 114 for onwards transmission as part of the audio communications session.

Each of the first and second user devices 110, 112 may be, for example, a smartphone, digital assistant, digital music player, personal computer, laptop, tablet computer or a wearable device such as a smartwatch.

The first and second user devices 110, 112 may also comprise one or more processors or controllers, one or more memories, and encoders/decoders for encoding/decoding audio data. The first and second user devices 110, 112 may be capable of establishing a communications session with a third party via a network, e.g. an audio or videoconference or a voice call. The first and second user devices 110, 112 may be configured to transmit and receive data over the communications network 114 using protocols for 3G, 4G, LTE, 5G or any future generation communication protocol. The first and second user devices 110, 112 may comprise one or more antennas for communicating with external devices.

One or both of the first and second earphones devices 120, 122 may also comprise passive and/or active noise reduction (ANR) features or functions for blocking at least some ambient sounds from reaching the ears of a user. As will be appreciated, ambient sounds from noise-producing sources which are external to an earphones device can be distracting. ANR features may include an ANR system, which is an electrical or electronic system associated with one or more microphones and one or more loudspeakers. The ANR system performs signal processing, for example by processing ambient sounds received by the one or more microphones in such a way as to generate a cancellation signal for output by the one or more loudspeakers. The cancellation signal, by means of destructive interference, acts to reduce or cancel the user's perception of the ambient sounds when it is output. For example, the ANR system may generate a cancellation signal which is in antiphase with received ambient sounds. Some ANR systems also provide a pass-through mode (sometimes called a hear-through or transparency mode) in which some ambient sounds are allowed to pass through without being cancelled.

In the FIG. 1A scenario, the first user device 110 may receive as part of the audio communications session stereo or spatialized audio from the second user device 112 (and vice versa).

For example, for stereo audio, the received signals may comprise first and second receive channels for respective output by the first and second earphones 120A, 120B of the first earphones device 120. For example, the first channel may predominately comprise a monaural representation of the second user's voice and the second channel may comprise a monaural representation of ambient sounds of the environment around the second user 102. This arrangement may be referred to as a near-far stereo.

For example, for spatialized audio, spatial information may be associated with one or both of the first and second channels, such that output of one or both of the channels "places" binauralized versions of the audio signals for being perceived as coming from a particular direction with respect to the user. For example, spatial information may comprise metadata associated with the first channel such that, when rendered by the first earphones device 120, a binauralized version of the second user's voice is perceived as coming from a particular direction. In this respect, a known codec is the Immersive Voice and Audio Services (IVAS) codec which may use metadata-assisted spatial audio (MASA) to place the audio in a receiving user's spatial field.

Referring now to FIG. 1B, it will be seen that the first earphone 120A of the first earphones device 120 has been removed from the first user's ear, as indicated by the arrow 124. This change event may be because the first user 100 wishes to converse with a third person 130 whilst maintaining the audio communications session. However, this may mean that some of the stereo or spatialized audio content cannot be heard, and it is perceived as monaural playback through the second earphones 120B.

This is not apparent to the second user 102 who may believe that the first user 100 is still experiencing stereo or spatialized playback and it may be that the first user 100 misses some important or interesting information as a consequence. In the meantime, the second user 102 may continue to experience stereo or spatialized playback from the first user 100.

Example embodiments may alleviate or mitigate this issue, enabling (in this case) the second user 102 to be made aware of such a change for improving communication, interaction and general environmental awareness between first and second users who may be remote from one another. This may be performed without the first user 100 having to inform the second user 102 verbally of the change event.

Figure 2:
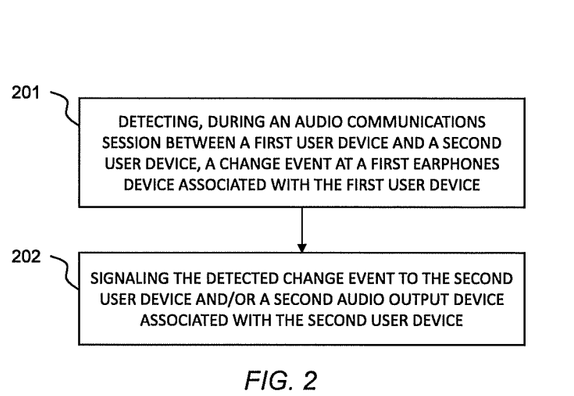
FIG. 2 is a flow diagram showing operations that may be performed in accordance with some example embodiments.

Referring to FIG. 2 a flow diagram is shown indicating processing operations that may be performed by, for example, the first user device 110 according to one or more example embodiments. The processing operations may be performed by hardware, software, firmware or a combination thereof. In some embodiments, the processing operations may be performed by one or more controllers or processors of the first user device 110, possibly under the control of computer-readable instructions (software code) stored on memory. The second user device 112 may also perform the processing operations, although the following will focus on the first user device 110 operation.

A first operation 201 may comprise detecting, during an audio communications session between a first user device 110 and a second user device 112, a change event at a first earphones device 120 associated with the first user device. The first earphones device may comprise first and second earphones 120A, 120B.

A second operation 202 may comprise signaling the detected change event to the second user device 112 and/or a second audio output device associated with the second user device. The abovementioned second earphones device 122 comprised of first and second earphones 122A, 122B is an example of a second audio output device associated with the second user device 112.

In some example embodiments, the first earphones device 120 is configured to receive first and second receive channels representing stereo or spatialized audio content from the second user device 112, wherein the detected change event is one that reduces a user's ability to perceive the received stereo or spatialized audio content. Put another way, the detected change event may be one which causes a change in presentation capability or presentation mode at the first earphones device 120.

For example, the first operation 201 may comprise detecting a change event corresponding to a user (the first user 100 in the shown example) removing one of the first and second earphones 120A, 120B from their ear. The first operation 201 may similarly comprise detecting one of the first and second earphones 120A, 120B accidentally become disengaged from their ear.

For example, the first operation 201 may additionally or alternatively comprise detecting a change event corresponding to a user initiating a function which mutes or attenuates one of the first and second receive channels. For example, the function may be a pass-through mode of an ANR system.

In some example embodiments, the second operation 202 may involve signaling an audio and/or visual alert to the second user device 112.

For example, the signaling may involve sounding a tone to the second user device 112 for output via one or both of the first and second earphones 122A, 122B of the second earphones device 122.

Figure 3:
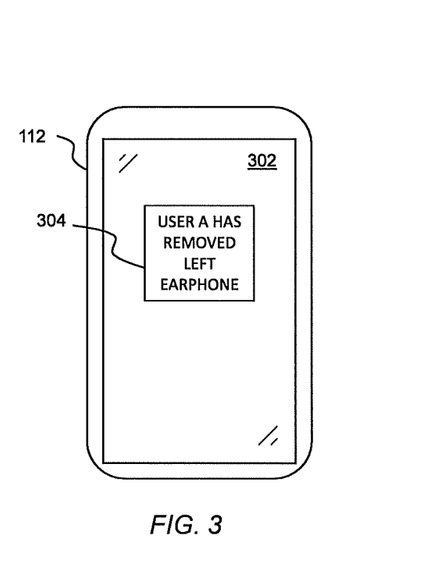
FIG. 3 is a plan view of a second user device, indicated in FIG. 1, when displaying a visual alert in accordance with some example embodiments.

For example, and with reference to FIG. 3, the signaling may comprise displaying on a user interface 302 of the second user device 112 a first visual alert 304 indicative of the change event. In either case, the nature of the audio alert and/or first visual alert 304 may indicate the particular change event, e.g. to sound or display "user A has removed right earphone" or similar.

In the case of an audio alert, the audio alert may be output by only one of the first and second earphones 122A, 122B to indicate the change event at the other end. For example, this may be by sounding an alert in the second earphone 122B that corresponds to the (non-removed) second earphone 120B at the other end, or vice versa so long as the convention is known.

Figure 4:
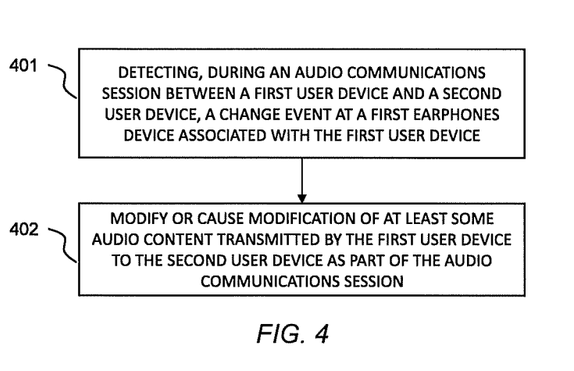
FIG. 4 is a further flow diagram showing operations that may be performed in accordance with some example embodiments.

Referring to FIG. 4 a flow diagram is shown indicating processing operations that may be performed by, for example, the first user device 110 according to one or more other example embodiments. The processing operations may be performed by hardware, software, firmware or a combination thereof. In some embodiments, the processing operations may be performed by one or more controllers or processors of the first user device 110. The second user device 112 may also perform the processing operations, although the following will focus on the first user device 110 operation.

A first operation 401, as for the FIG. 2 method, may comprise detecting, during an audio communications session between a first user device 110 and a second user device 112, a change event at a first earphones device 120 associated with the first user device. The first earphones device may comprise first and second earphones 120A, 120B.

A second operation 402 may comprise signaling the detected change event to the second user device 112 and/or a second audio output device associated with the second user device by means of modifying, or causing modification of, at least some audio content transmitted by the first user device 110 to the second user device 112 as part of the audio communications session, i.e. including voice.

The modifying to be described herein can be performed at the first user device 110. Alternatively, or additionally, modifying can be performed at the second user device 112 responsive to the signaling from the first user device 110. The second user device 112 may receive the originally transmitted audio content in first and second channels but renders the channels in a modified way responsive to the received signaling.

For example, the first user device 110 may be configured to transmit first and second transmit channels representing stereo or spatialized audio content to the second user device 112 for output using the second earphones device 122 comprised of first and second earphones 122A, 122B.

For example, the signaling may signal the detected change event by means of modifying, or causing modification of, stereo audio content to become monaural audio content. That is, one of the first and second transmit channels may not be transmitted, or said transmit channel may be muted, attenuated or simply not rendered by the second user device 112.

For example, the signaling may be configured to indicate, by means of output of the monaural audio content to one of the first and second earphones 122A, 122B of the second earphones device 122, which of the first and second earphones 120A, 120B of the first earphones device 120 the change event is associated with.

Taking the FIG. 1B example, the change event is associated with the first earphone 120A of the first earphones device 120 and hence the signaling may modify or cause modification such that the first channel is not output by the first earphone 122A of the second earphones device 122. The first channel may not be output at all, or it may be moved to the second earphone 122B to replace the second channel.

For example, the signaling may signal the detected change event by means of modifying, or causing modification of, spatialized audio content to become stereo audio content, e.g. near-far stereo as mentioned above.

For example, the spatialized audio content may comprise a first channel representing a first audio object to be perceived from a particular direction and a second channel representing ambience to be perceived from a range of directions. The signaling may modify or cause modification such that the spatialized audio content is converted to first and second monaural channels for output by particular ones of the respective first and second earphones 122A, 122B of the second earphones device 122.

The signaling may be configured to indicate, by means of output of the first and second monaural channels by particular ones of the first and second earphones 122A, 122B of the second earphones device 122, which of the first and second earphones 120A, 120B of the first earphones device 120 the change event is associated with.

Figure 5A:
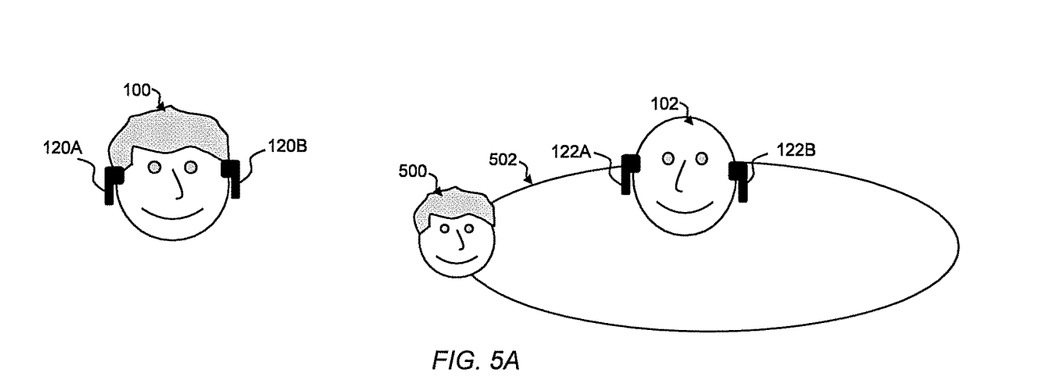
FIG. 5A is a schematic view of first and second users with respective first and second earphones devices engaged in another communications session.

For example, and with reference to FIGS. 5A, consider the case where a first transmit channel represents a voice audio object 500 for being output predominately from the direction of the first earphone 122A of the second earphones device 122 and a second transmit channel represents ambience 502 to be perceived from a range of directions around the second user 102.

Figure 5B:
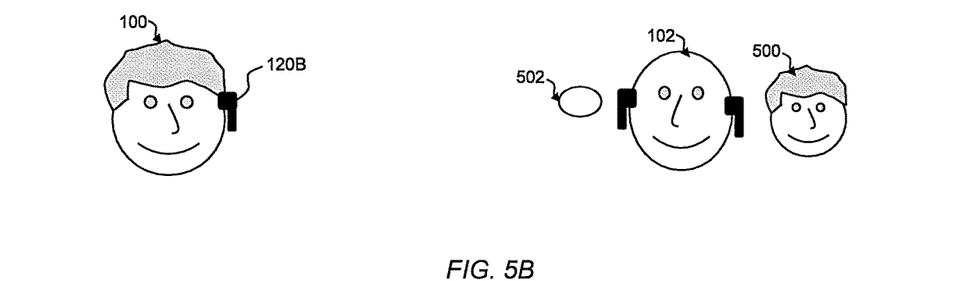
FIG. 5B is a schematic view based on FIG. 5A, indicating how audio is modified at the second earphones device responsive to an earphone of the first earphones device becoming removed.

Now, with reference to FIG. 5B, responsive to detection that the change event relates to the first earphone 120A of the first earphones device 120, in this case said earphone being removed, the signaling may be configured to indicate said change event by outputting the first channel as a monaural channel from the second earphone 122B of the second earphones device 122 to indicate the event at the first earphones device 120. The second user 102 may understand by convention what this means. Also, the second transmit channel representing ambience 502, may be output as a monaural channel from the first earphone 122A of the second earphones device 122. In overview, the switch from spatialized audio to near-far stereo audio indicates to the user that an event has occurred, and the fixing of the first, voice audio to the second earphone 122B indicates that the event relates to the first earphone 120A of the first earphones device 120.

In another example embodiment, which may be performed subsequent to detecting a change event comprising removal of one of the first and second earphones 120A, 120B of the first earphones device 120, another operation may comprise detecting pickup of audio signals by one or more microphones of the removed earphone. For example, the picked-up audio signals may be transmitted in a monaural transmit channel to the corresponding earphone 122A, 122B of the second earphones device 122. For example, if the picked-up audio signal is above a predetermined level, and/or for a predetermined period of time, it may trigger re-spatializing of the first and second monaural channels for output by the first and second earphones 122A, 122B of the second earphones device 122. This may be performed temporarily.

Figure 6A:
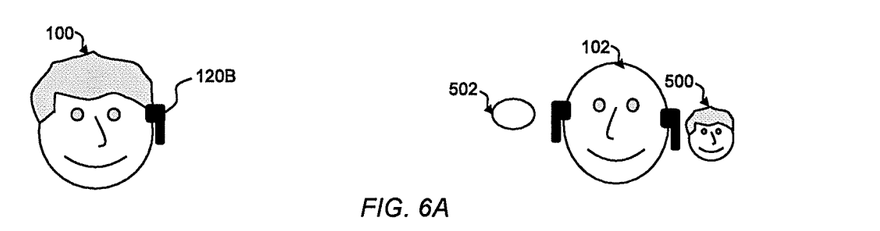
FIG. 6A is a schematic view of first and second users with respective first and second earphones devices engaged in another communications session.
Figure 6B:
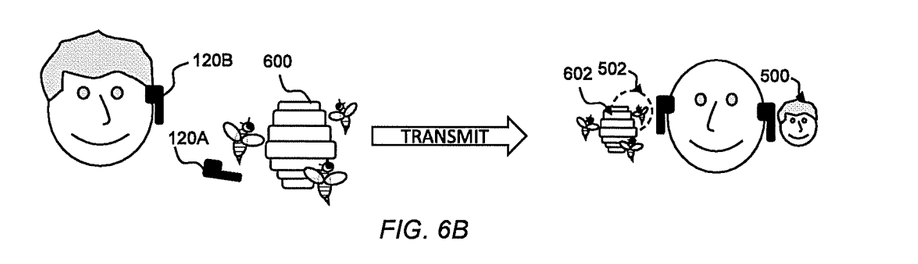
FIG. 6B is a schematic view based on FIG. 6A, indicating how audio is modified at the second earphones device responsive to an earphone of the first earphones device picking up sounds.
Figure 6C:
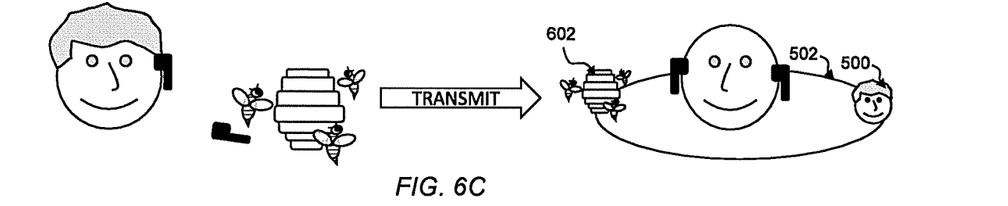
FIG. 6C is a schematic view based on FIG. 6B, indicating how audio is modified at the second earphones device responsive the sounds being above a predetermined level.

For example, with reference to FIGS. 6A-6C, it will be seen that FIG. 6A corresponds with the FIG. 5B in which the first earphone 120A of the first earphones device 120 has been removed. Referring to FIG. 6B, the first user 100 may note some interesting audio object 600 and use the said first earphone 120A as a close-up microphone to convey sounds from the audio object to the second user 102. This may transmit the sounds over the first transmit channel to the first earphones 122A of the second user 102 to output a corresponding audio object 602 in addition to, in this case, the ambience 502. Referring to FIG. 6C, when above a predetermined level, re-spatialization may be performed, at least temporarily, such that the FIG. 5A scenario is returned to, with the additional audio object 602 placed in the spatial sound field of the second user 102. The temporary nature of the re-spatialization serves to remind the second user 102 that the first user 100 has yet to replace the first earphone 120A in their ear.

For completeness, in order to detect that one of the first and second earphones 120A, 120B has become removed from a user's ear, there are various methods that can be employed.

For example, there may be provided a photo detector mounted at or in an ear-insert portion of the earphone. The photo detector, when properly engaged with a user's ear, is covered and hence little or no light will be received and hence little or no signal sent to a controller for sensing the removal. As the earphone is removed, some ambient light will be received by the photo detector and hence some signal sent to the controller. If above a threshold, the controller may signal removal.

Additionally, or alternatively, detection of an earphone becoming removed may be based on audio processing. For example, a controller may be configured to measure, based on audio processing, a distance between a reference part of an ear-insert portion of the earphone and the user's ear drum, and monitor this distance to identify a particular distance that is indicative of a removed condition.

Additionally, or alternatively, an orientation sensor may be provided in each earphone to determine an in-use or removed condition.

Example embodiments therefore provide an intuitive way of informing remote users about events that may affect another user's ability to understand or appreciate part of an audio communications session. Example embodiments may involve signaling not only the event, but also the nature of the event based on how audio being received from them is modified.

Example Apparatus

Figure 7:
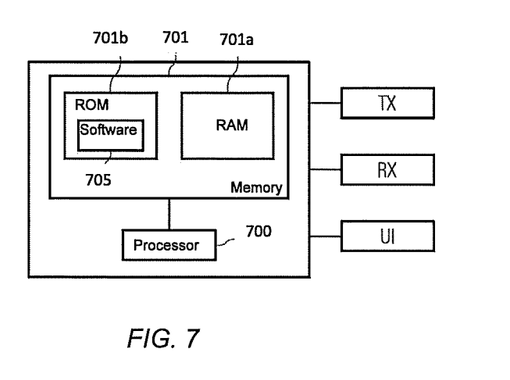
FIG. 7 shows an apparatus in accordance with an example embodiment.

FIG. 7 shows an apparatus according to some example embodiments, which may comprise either or both of the first user device 110 and second user device 112 if configured to perform the operations disclosed herein. The apparatus may be configured to perform the operations described herein, for example operations described with reference to any disclosed process. The apparatus comprises at least one processor 700 and at least one memory 701 directly or closely connected to the processor. The memory 701 includes at least one random access memory (RAM) 701a and at least one read-only memory (ROM) 701b. Computer program code (software) 705 is stored in the ROM 701b. The apparatus may be connected to a transmitter (TX) and a receiver (RX). The apparatus may, optionally, be connected with a user interface (UI) for instructing the apparatus and/or for outputting data. The at least one processor 700, with the at least one memory 701 and the computer program code 705 are arranged to cause the apparatus to at least perform at least the method according to any preceding process, for example as disclosed in relation to the flow diagrams of FIGS. 2 and/or 4 and related features thereof.

Figure 8:
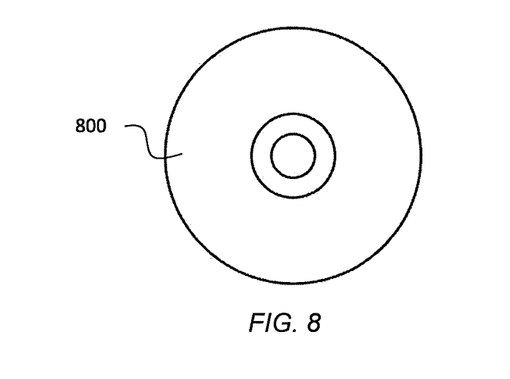
FIG. 8 shows a non-transitory media in accordance with an example embodiment.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program code, causing an apparatus to perform the method of any preceding process for example as disclosed in relation to the flow diagrams of FIGS. 2 and/or 4 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory storing instructions that, when executed with the at least one processor, cause the apparatus at least to:
detect, during an audio communications session between a first user device and a second user device, a change event at a first earphones device associated with the first user device, the first earphones device comprising first and second earphones; and
signal the detected change event to the second user device and/or a second audio output device associated with the second user device with modifying, or causing modification of, spatialized audio content transmitted with the first user device to the second user device to become stereo content, wherein the spatialized audio content comprises a first first audio object channel representing a configured to be perceived from a first direction and a second channel representing at least one of: ambience configured to be perceived from a range of directions, or a second audio object configured to be perceived from a second direction, wherein the stereo content comprises first and second monaural channels configured to be output with respective ones of first and second earphones of the second audio output device, wherein the second audio output device comprises a second earphones device.

2. The apparatus of claim 1, wherein the first earphones device is configured to receive first and second receive channels representing stereo or spatialized audio content from the second user device, wherein the detected change event is one that reduces a user's perception of the received stereo or spatialized audio content.

3. The apparatus of claim 2, wherein the at least one memory stores instructions that, when executed with the at least one processor, cause the apparatus to:
detect a change event corresponding to one of the first and second earphones of the first earphones device becoming removed from an ear of the user.

4. The apparatus of claim 2, wherein the at least one memory stores instructions that, when executed with the at least one processor, cause the apparatus to:

detect a change event corresponding to the user initiating a function which mutes or attenuates one of the first and second receive channels.

5. The apparatus of claim 4, wherein the function is a pass-through mode of an active noise reduction system.

6. The apparatus of claim 1, wherein the first user device is configured to transmit first and second transmit channels representing stereo content or the spatialized audio content to the second user device for output using the second audio output device.

7. The apparatus of claim 1, wherein the at least one memory stores instructions that, when executed with the at least one processor, cause the apparatus to:
indicate, with output of the first and second monaural channels with respective ones of the first and second earphones of the second earphones device, which of the first and second earphones of the first earphones device the change event is associated with.

8. The apparatus of claim 7, wherein the first channel represents a voice audio object for being output predominately from a direction of the first earphone of the first earphones device, wherein responsive to detection that the change event relates to said first earphone of the first earphones device, the at least one memory stores instructions that, when executed with the at least one processor, cause the apparatus to:
indicate said change event with causing outputting of the first channel as a monaural channel from the second earphone of the second earphones device.

9. The apparatus of claim 1, where the at least one memory stores instructions that, when executed with the at least one processor, cause the apparatus to:
perform, subsequent to detecting removal of one of the first and second earphones of the first earphones device, detecting pickup of audio signals with one or more microphones of the removed earphone above a predetermined level, and, responsive thereto, re-spatializing the first and second channels for output with the second earphones device, at least temporarily.

10. A method comprising:
detecting, during an audio communications session between a first user device and a second user device, a change event at a first earphones device associated with the first user device, the first earphones device comprising first and second earphones; and
signaling the detected change event to the second user device and/or a second audio output device associated with the second user device with modifying, or causing modification of, spatialized audio content transmitted with the first user device to the second user device to become stereo content, wherein the spatialized audio content comprises a first channel representing a first audio object configured to be perceived from a first direction and a second channel representing at least one of: ambience configured to be perceived from a range of directions, or a second audio object configured to be perceived from a second direction, wherein the stereo content comprises first and second monaural channels configured to be output with respective ones of first and second earphones of the second audio output device, wherein the second audio output device comprises a second earphones device.

11. The method of claim 10, wherein the first earphones device is configured to receive first and second receive channels representing stereo or spatialized audio content from the second user device, wherein the detected change event is one that reduces a user's perception of the received stereo or spatialized audio content.

12. The method of claim 11, further comprising:
detecting a change event corresponding to one of the first and second earphones of the first earphones device becoming removed from an ear of the user.

13. The method of claim 11, further comprising:
detecting a change event corresponding to the user initiating a function which mutes or attenuates one of the first and second receive channels.

14. The method of claim 13, wherein the function is a pass-through mode of an active noise reduction system.

15. The method of claim 10, wherein the first user device is configured to transmit first and second transmit channels representing stereo content or the spatialized audio content to the second user device for output using the second audio output device.

16. The method of claim 10, further comprising:
indicating, with output of the first and second monaural channels with respective ones of the first and second earphones of the second earphones device, which of the first and second earphones of the first earphones device the change event is associated with.

17. The method of claim 16, wherein the first channel represents a voice audio object for being output predominately from a direction of the first earphone of the first earphones device, wherein responsive to detection that the change event relates to said first earphone of the first earphones device, the method further comprising:
indicating said change event with causing outputting of the first channel as a monaural channel from the second earphone of the second earphones device.

18. The method of claim 10, further comprising:
performing, subsequent to detecting removal of one of the first and second earphones of the first earphones device, detecting pickup of audio signals with one or more microphones of the removed earphone above a predetermined level, and, responsive thereto, re-spatializing the first and second channels for output with the second earphones device, at least temporarily.

19. A non-transitory computer-readable medium comprising program instructions stored thereon for performing at least the following:
detecting, during an audio communications session between a first user device and a second user device, a change event at a first earphones device associated with the first user device, the first earphones device comprising first and second earphones; and
signalling the detected change event to the second user device and/or a second audio output device associated with the second user device with modifying, or causing modification of, spatialized audio content transmitted with the first user device to the second user device to become stereo content, wherein the spatialized audio content comprises a first channel representing a first audio object configured to be perceived from a first direction and a second channel representing at least one of: ambience configured to be perceived from a range of directions, or a second audio object configured to be perceived from a second direction, wherein the stereo content comprises first and second monaural channels configured to be output with respective ones of first and second earphones of the second audio output device, wherein the second audio output device comprises a second earphones device.

20. The non-transitory computer-readable medium of claim 19, wherein the first earphones device is configured to receive first and second receive channels representing stereo or spatialized audio content from the second user device, wherein the detected change event is one that reduces a user's perception of the received stereo or spatialized audio content.

* * * * *